United States Patent
Tsuda et al.

(10) Patent No.: US 8,190,014 B2
(45) Date of Patent: May 29, 2012

(54) FOCUS CONTROL CIRCUIT FOR ADJUSTING THE FOCUS BY MOVING A LENS

(75) Inventors: Hiroyuki Tsuda, Ichinomiya (JP); Takeshi Kura, Ogaki (JP)

(73) Assignees: Sanyo Semiconductor Co., Ltd., Gunma (JP); Semiconductor Components Industries, LLC, Phoenix, AZ (US)

( * ) Notice: Subject to any disclaimer, the term of this patent is extended or adjusted under 35 U.S.C. 154(b) by 0 days.

(21) Appl. No.: 12/797,394

(22) Filed: Jun. 9, 2010

(65) Prior Publication Data

US 2010/0322612 A1    Dec. 23, 2010

(30) Foreign Application Priority Data

Jun. 18, 2009 (JP) ................. 2009-145363
Jun. 18, 2009 (JP) ................. 2009-145364

(51) Int. Cl.
    *G03B 13/36* (2006.01)
(52) U.S. Cl. ......................................... 396/133
(58) Field of Classification Search .................. 396/133
    See application file for complete search history.

(56) References Cited

U.S. PATENT DOCUMENTS

| | | | |
|---|---|---|---|
| 5,305,158 A * | 4/1994 | Ueda et al. | 360/75 |
| 6,584,048 B1 * | 6/2003 | Tateishi et al. | 369/44.28 |
| 7,106,233 B2 * | 9/2006 | Schroeder et al. | 341/141 |
| 7,224,893 B2 * | 5/2007 | Uenaka | 396/55 |
| 7,599,810 B2 * | 10/2009 | Yamazaki | 702/94 |
| 7,607,661 B2 * | 10/2009 | Akiyama et al. | 271/265.01 |
| 7,885,523 B2 * | 2/2011 | Ohno et al. | 396/55 |
| 2004/0083822 A1 * | 5/2004 | Mukai et al. | 73/862.195 |
| 2008/0317452 A1 | 12/2008 | Kim et al. | |

FOREIGN PATENT DOCUMENTS

| | | |
|---|---|---|
| JP | 2006-166403 | 6/2006 |
| KR | 10-2008-0112065 A | 12/2008 |
| WO | WO 2009/011547 A1 | 1/2009 |

OTHER PUBLICATIONS

Chinese Office Action, w/ English translation thereof, issued in Chinese Patent Application No. CN 201010194075.X.
Korean Office Action, with English translation, issued in Korean Patent Application No. 10-2010-0057449, dated Aug. 29, 2011.

* cited by examiner

*Primary Examiner* — W. B. Perkey
(74) *Attorney, Agent, or Firm* — McDermott Will & Emery LLP

(57) ABSTRACT

A focus control circuit is installed in an image pickup apparatus including a lens, a driver element for adjusting the position of the lens, and a position detecting element for detecting the position of the lens. A feedback equalizer included in the focus control circuit generates a drive signal used to adjust the position of the lens to a target position, based on a difference between the position of the lens identified by the output signal of the position detecting element and the target position of the lens set externally, and controls the driver element.

5 Claims, 4 Drawing Sheets

FOCUS CONTROL CIRCUIT FOR ADJUSTING THE FOCUS BY MOVING A LENS

CROSS-REFERENCE TO RELATED APPLICATIONS

This application is based upon and claims the benefit of priority from the prior Japanese Patent Applications No. 2009-145363, filed on Jun. 18, 2009, and Japanese Patent Applications No. 2009-145364, filed on Jun. 18, 2009, the entire contents of which are incorporated herein by reference.

BACKGROUND OF THE INVENTION

1. Field of the Invention

The present invention relates to a focus control circuit for determining the focus position by actively moving a lens.

2. Description of the Related Art

Most of camera modules installed in commonly-used digital cameras and mobile phones are provided with auto-focusing functions. A contrast detecting method is often used as the auto-focusing function employed in such a compact-size camera. In the contrast detecting method, a lens position in which the contrast of a subject lying in a picked-up image frame is maximized is detected by actively moving the lens and then the lens is moved to the detected position.

SUMMARY OF THE INVENTION

The contrast detecting method can be achieved with less cost than an active method in which the subject is irradiated with infrared rays or ultrasonic waves and the distance to the subject is measured based on the reflected waves. Nevertheless, the contrast method has a drawback in that it takes some time to complete a search for the lens position in which the contrast of a subject is maximized. It is desired that the processing of focusing the subject be completed within one second after a user has pressed a shutter button halfway.

The number of pixels of each cameral module installed in the commonly-used digital cameras and mobile phones is increasing every year. As a result, high-resolution images can be easily taken with such a compact-size camera. When the high-resolution images are taken, out-of-focus shots may be easily noticeable and therefore further high-precision auto-focus control is required.

A focus control circuit according to one embodiment of the present invention is installed in an image pickup apparatus including a lens, a driver element for adjusting the position of the lens, and a position detecting element for detecting the position of the lens, and the focus control circuit includes: a feedback equalizer configured to generate a drive signal used to adjust the position of the lens identified by an output signal of the position detecting element to a target position of the lens set externally, based on a difference between the position of the lens identified thereby and the target position of the lens set externally and configured to control the driver element.

Another embodiment of the present invention relates to an image pickup apparatus. This apparatus comprises: a lens; image pickup devices configured to convert light transmitted through the lens into an electric signal; a driver element configured to adjust the position of the lens; a position detecting element configured to detect the position of the lens; an image signal processor configured to determine a target position of the lens, based on an output signal of the image pickup devices; and a feedback equalizer configured to generate a drive signal used to adjust the position of the lens identified by an output signal of the position detecting element to the target position of the lens set by the image signal processor, based on a difference between the position of the lens identified thereby and the target position of the lens set thereby and configured to control the driver element.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

Figure 1:
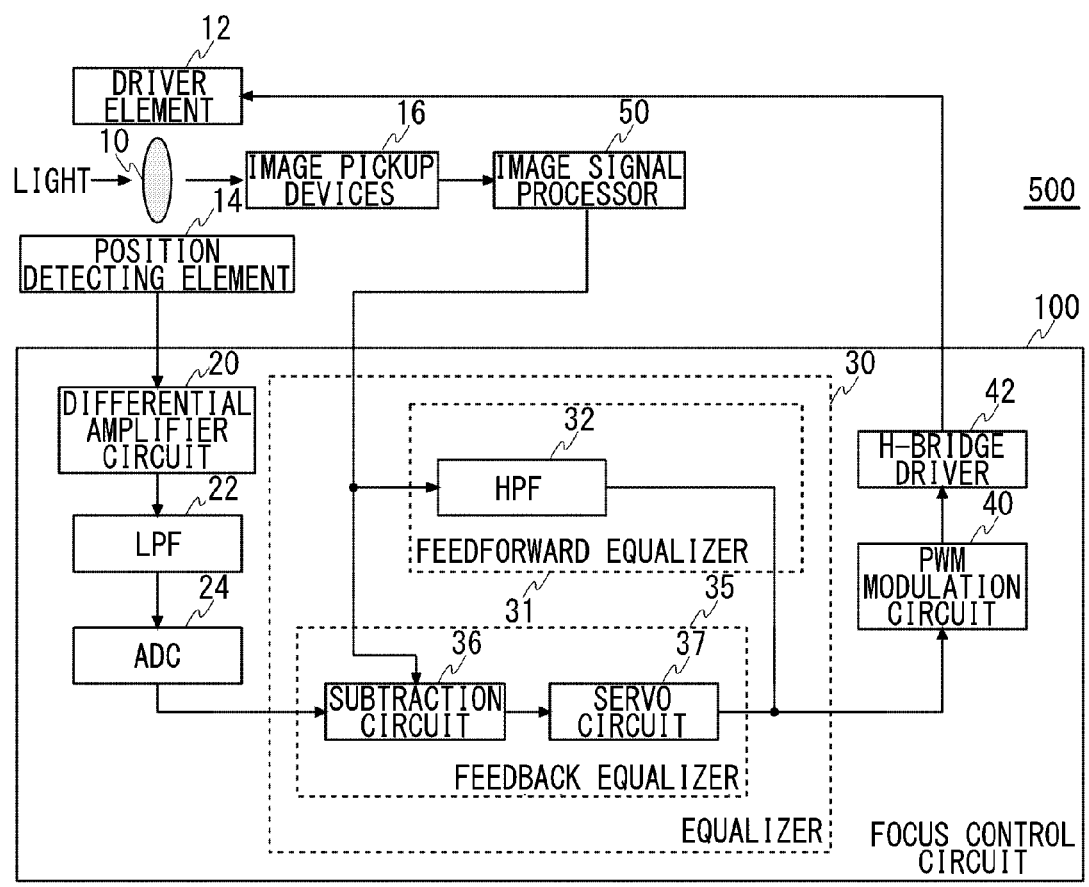
FIG. 1 illustrates a structure of an image pickup apparatus provided with a focus control circuit according to a first embodiment of the present invention.

FIG. 1 illustrates a structure of an image pickup apparatus 500 provided with a focus control circuit 100 according to a first embodiment of the present invention. The image pickup apparatus 500 includes a lens 10, a driver element 12, a position detecting element 14, image pickup devices 16, an image signal processor (ISP) 50, and a focus control circuit 100. Other structural components, such as an image coding engine and a recording medium, which are not involved in the auto-focus control are omitted in FIG. 1.

The image pickup devices 16 convert the light signals transmitted through the lens 10, which is an optical component, into electric signals and outputs the electric signals to the image signal processor 50. The image pickup devices 16 may be CCD (charge-coupled device) sensors or CMOS (complementary metal-oxide semiconductor) image sensors.

The driver element 12, which is an element used to adjust the position of the lens 10, moves the lens 10 along an optical direction in response to a drive signal supplied from the focus control circuit 100. Thereby, the focal lengths of the lens and the image pickup devices 16 are adjusted. The driver element 12 may be a voice coil motor (VCM).

The position detecting element 14 is an element used to detect the position of the lens 10. A hall element may be used as the position detecting element 14. A description is given hereinbelow of an example where the driver element 12 and the position detecting element 14 are configured by an actuator comprised of a voice coil motor and a hall element.

The image signal processor 50 processes image signals outputted from the image pickup devices 16. In the present embodiment, the image signal processor 50 principally determines a target position of the lens 10, based on the image signals outputted from the image pickup devices 16.

Figure 2:
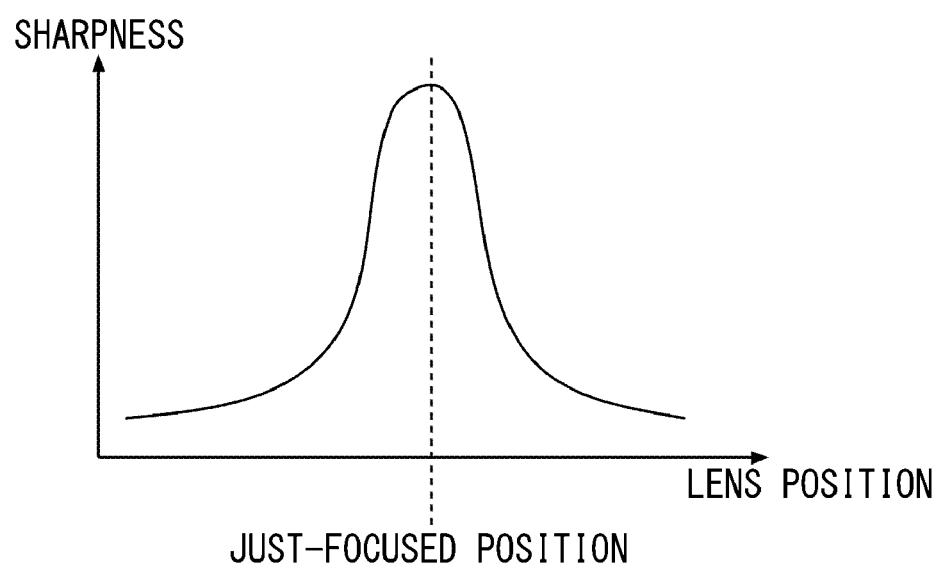
FIG. 2 is a graph to explain a processing, performed by an image signal processor, to determine a target position of a lens.

FIG. 2 is a graph to explain a processing, performed by the image signal processor 50, to determine the target position of the lens 10. As an auto-focusing function, such as a shutter button being half push state, is activated, the image signal processor 50 transmits a control signal by which to move the lens stepwise at a predetermined step width, to the focus control circuit 100. In so doing, the image signal processor 50 calculates the sharpness of each image signal picked up in each position of the lens 10. For example, the sharpness thereof may be obtained and evaluated in such a manner that an edge component of each image signal is extracted by subjecting the image signal to a high-pass filter and then the edge component of each image signal is accumulated. The image signal processor 50 determines the position of the lens 10 where the sharpness becomes maximum, to be a just-focused position.

Referring back to FIG. 1, the focus control circuit 100 includes a differential amplifier circuit 20, a low-pass filter 22, an analog-to-digital converter (ADC) circuit 24, an equalizer 30, a PWM modulation circuit 40, and an H-bridge driver 42. If the focus control circuit 100 is implemented on a single-chip LSI, the low-pass filter 22 may be provided external to the single-chip LSI.

The differential amplifier circuit 20 amplifies the potential difference between the output terminals of the position detecting element 14 (i.e., the hall element), and outputs it as a position signal. The hall element outputs a voltage proportional to the magnetic flux density of magnetic field formed by the magnet provided with the lens 10. As the magnetic flux density varies due to a movement of the lens 10, the output voltage of the hall element varies in proportion to the variation in magnetic flux density. Thus, the position of the lens 10 can be estimated based on the output voltage of the hall element.

The low-pass filter 22 removes the high-frequency components of the position signal outputted from the differential amplifier circuit 20. The analog-to-digital converter circuit 24 converts the position signal from analog values into digital values.

The equalizer 30 includes a feedforward equalizer 31 and a feedback equalizer 35. As the target position of the lens 10 set by the image signal processor 50 is changed from the previous position to a new position, the feedforward equalizer 31 generates a drive signal, having high-pass filter characteristics, with which to move the lens 10 from the previous position to the new position, and controls the driver element 12.

A more detailed description will now be given as follows. The feedforward equalizer 31 includes a high-pass filter 32. A target position signal is set to the high-pass filter 32 from the image signal processor 50 via an interface such as an I2C interface. As an auto-focusing function is activated, the image signal processor 50 transmits the target position signal by which to sequentially change the position of the lens 10, to the feedforward equalizer 31. This target position signal is a signal the value of which increases or decreases progressively at a predetermined step width. The high-pass filter 32 outputs the value of the target position signal increased or decreased, to the PWM modulation circuit 40.

The output signal of the high-pass filter 32 is a signal indicating the amount of movement of the aforementioned voice coil motor. Since the output signal of the high-pass filter 32 has differential characteristics, it is a signal having a precipitous rising edge and therefore the lens 10 can be moved promptly to the new target position from the previous position.

The feedback equalizer 35 generates a drive signal as follows. Here, the driver signal generated by the feedback equalizer 35 is a signal used to align the position of the lens 10 identified by the output signal of the position detecting element 14 to the target position of the lens 10 set by the image signal processor 50. That is, the feedback equalizer 35 generates the drive signal, based on a difference between the position of the lens 10 identified thereby and the target position of the lens 10 set thereby, and controls the driver element 12. As described above, the position signal, which is outputted from the position detecting element 14 and then passes through the low-pass filter 22 and the analog-to-digital converter circuit 24, is inputted to the feedback equalizer 35. Also, the target position signal is inputted to the feedback equalizer 35 from the image signal processor 50.

A more detailed description will now be given here. The feedback equalizer 35 includes a subtraction circuit 36 and a servo circuit 37. The subtraction circuit 36 calculates the difference between the position signal outputted from the position detecting element 14 and the target position signal inputted from the image signal processor 50, and then outputs the calculated difference as error signal. If the position of the lens 10 is in the target position, the difference therbetween will be zero. The servo circuit 37 generates a signal used to cancel out the error signal outputted from the subtraction circuit 36, and outputs the thus generated signal to the PWM modulation circuit 40.

The PWM modulation circuit 40 converts a signal inputted from the feedforward equalizer 31 and the feedback equalizer 35, into a pulse signal having a duty ratio that corresponds to the digital value thereof. The H-bridge driver 42, which includes at least four transistors, turns on two transistors along a diagonal line, so that the current can be delivered to the voice coil motor. Also, the H-bridge driver 42 turns on the other two transistors along another diagonal line, so that the direction of current flowing to the voice coil motor can be opposite.

The H-bridge driver 42 delivers the current to the voice coil motor in the direction of current and with the amount of current flow that both correspond to the pulse signal inputted from the PWM modulation circuit 40, and thereby moves the voice coil motor by a predetermined distance and toward a predetermined direction. As a result, the lens 10 can be moved to the target position so as to adjust the focus properly.

By employing the first embodiment as described above, the focusing accuracy can be improved in the auto-focus control that determines the focus position by actively moving the lens. In other words, the position detecting element 14 is provided and the present position of the lens 10 is detected so as to perform a feedback control. Thus, the lens 10 can be focused on a target position with high precision. If this feedback control is realized by an exclusive-use hardware, the processing can be done faster than when the image signal processor 50 is used as a firmware and also the focusing time (convergence time) required for the lens 10 to reach the target position can be reduced. Also, the increase in the load on the image signal processor 50 can be suppressed.

Also, provision of a feedforward control system separately from a feedback control system enables the lens 10 to be focused on the target position at high speed. The drive signal in the feedback control system has low-pass filter characteristics and therefore the movement of the driver element 12 is more stabilized. However, as compared with the feedforward control system, the movement of the driver element 12 is slower. On the other hand, the drive signal in the feedforward control system has high-pass filter characteristics and therefore the movement of the driver element 12 is precipitous. However, as compared with the feedback control system, the accuracy of the driver element 12 is less. In this manner, the combined use of the feedback control system and the feedforward system complement each other's weakness and therefore the lens 10 can be focused on a target position with high precision and at high speed.

Where the voice coil motor is used as the driver element 12, no current needs to be delivered to hold the target position of the lens and the current needs only to be delivered when the lens is to be moved. Thus power consumption can be reduced. In contrast, if a spring-mounted actuator is used, the current must be constantly delivered to hold the target position against the biasing force of the spring.

Also, the image signal processor 50 does not have to be involved in the feedback control and the feedforward control, and the image signal processor 50 needs only to output the target position of the lens 10 to the focus control circuit 100. Hence, the lens 10 can be focused on the target position with high precision and at high speed, without increasing the load of the image signal processor 50, namely without increasing the power consumed by the image signal processor 50.

Figure 3:
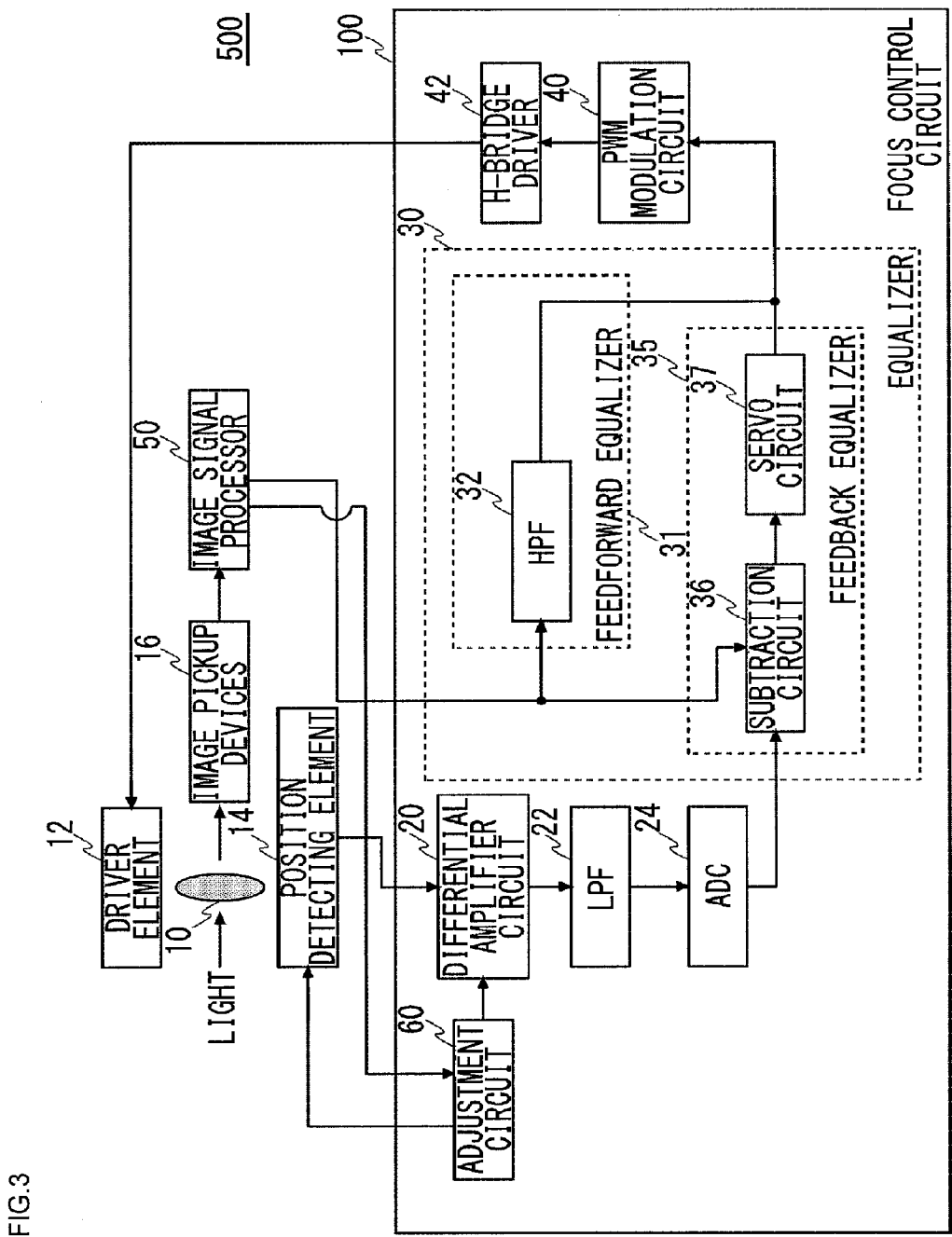
FIG. 3 illustrates a structure of an image pickup apparatus provided with a focus control circuit according to a second embodiment of the present invention.

FIG. 3 illustrates a structure of an image pickup apparatus 100 provided with a focus control circuit 100 according to a second embodiment of the present invention. The focus control circuit 100 according to the second embodiment is configured such that an adjustment circuit 60 is added to the focus control circuit 100 according to the first embodiment. The adjustment circuit 60 adjusts at least one of gain and offset of the position detecting element 14. More specifically, the adjustment circuit 60 adjusts at least one of gain and offset of the position detecting element 14 so that the voltage range of the output signals of the position detecting element 14 can be contained within the allowable input voltage range of the analog-to-digital converter circuit 24.

Figure 4:
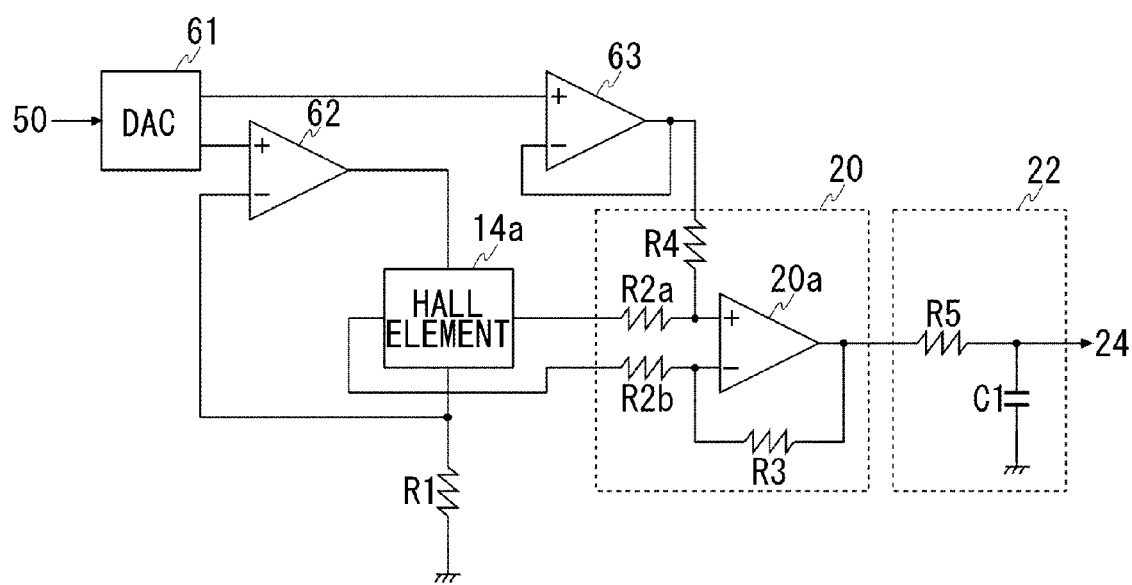
FIG. 4 illustrate an exemplary configuration of a circuit comprised of a position detecting element, a differential amplifier circuit, a low-pass filter, and a regulator circuit.

FIG. 4 illustrates an exemplary configuration of a circuit comprised of the position detecting element 14, the differential amplifier circuit 20, the low-pass filter 22, and the regulator circuit 60. In FIG. 4, a hall element 14a is used as the position detecting element 14. The regulator circuit 60 includes a digital-to-analog converter (DAC) circuit 61, a differential amplifier circuit 62, and a buffer 63.

A first input terminal of the hall element 14a is connected to an output terminal of an operational amplifier that constitutes the differential circuit 62, whereas a second input terminal of the hall element 14a is grounded via a first resistor R1. A first output terminal of the hall element 14a is connected, via a second resistor R2a, to a noninverting input terminal of an operational amplifier 20a that constitutes the differential amplifier circuit 20, whereas a second output terminal of the hall element 14a is connected to an inverting input terminal of the operational amplifier 20a via a second resistor R2b.

An output voltage V of the hall element 14a is defined by the following Equation (1).

$$V = \alpha \cdot I \cdot B \quad \text{(Equation 1)}$$

where α is an element parameter, I is a bias current, and B is a magnetic flux density.

In the second embodiment, the hall element 14a is driven by a constant current. In other words, the operational amplifier that constituting the differential amplifier circuit 62 keeps the voltage applied across the input terminals of the hall element 14a constant and thereby performs a control such that a bias current, which is a constant current, can flow through the hall element 14a.

A noninverting input terminal of the operational amplifier that constitutes the differential amplifier circuit 62 is connected to the DAC circuit 61, whereas an inverting input terminal of this operational amplifier is connected to the second input terminal of the hall element 14a. The output terminal of this operational amplifier is connected to the first input terminal of the hall element 14a. The noninverting input terminal of this operational amplifier receives a gain adjustment value from the DAC circuit 61. This operational amplifier amplifies the difference between the gain adjustment value and the voltage value of the second input terminal of the hall element 14a, and supplies the differentially-amplified difference to the first input terminal of the hall element 14a.

A noninverting input terminal of an operational amplifier that constitutes the buffer 63 is connected to the DAC circuit 61, and an output terminal of this operational amplifier is connected to the noninverting input terminal of the operational amplifier 20a that constitutes the differential amplifier circuit 20, via a fourth resistor R4. The output terminal of the operation amplifier that constitutes the buffer 63 is also connected to the inverting input terminal thereof. The noninverting input terminal of this operation amplifier receives an offset adjustment value from the DAC circuit 61, and the operational amplifier adds the offset adjustment value to an output value of the hall element 14a.

The noninverting input terminal of the operational amplifier 20a that constitutes the differential amplifier circuit 20 is connected to the first output terminal of the hall element 14a via the second resistor R2a and also connected to the output terminal of the operational amplifier constituting the buffer 63, via a fourth resistor R4. The inverting input terminal of the operational amplifier 20a that constitutes the differential circuit 20 is connected to the second output terminal of the hall element 14a via the second resistor R2b. An output terminal of the operational amplifier 20a is connected to the ADC circuit 24 via a fifth resistor R5 that constitutes the low-pass filer 22. The output terminal of the operational amplifier 20a is also connected to the inverting input terminal thereof via a third resistor R3.

The operational amplifier 20a amplifiers the potential difference between the output terminals of the hall element 14a and then outputs the amplified difference to the ADC circuit 24. In so doing, the operational amplifier 20a adds the aforementioned offset adjustment value to the output voltage outputted to the ADC circuit 24.

The low-pass filter 22, which is configured by a fifth resistor R5 and a capacitor C1, integrates the output voltages of the operational amplifier 20a constituting the differential amplifier circuit 20 and then outputs the integrated output voltage to the ADC circuit 24.

The image signal processor 50 supplies the gain adjustment value and the offset adjustment value of the hall element 14a to the DAC circuit 61. The DAC circuit 61 converts the gain adjustment value supplied from the image signal processor 50, into an analog value from the digital value, and outputs the analog value to the differential amplifier circuit 62. Also, the DAC circuit 61 converts the offset adjustment value supplied from the image signal processor 50, into an analog value from the digital value, and outputs the analog value to the buffer 63.

Note here that the offset of the hall element 14a is a voltage occurring between the output terminals thereof under no magnetic fields and this is also called an unbalanced voltage. The hall element may suffer from variations in the sensitivity thereof depending on a manufacturing variation and temperature characteristics. These variations cause the bit error in the ADC circuit 24, thereby contributing to a drop in the precision of the feedback control.

Thus, in the second embodiment, the adjustment circuit 60 adjusts the gain and the offset of the hall element 14a and thereby the adjustment circuit 60 calibrates the output voltage range of the hall element 14a in such a manner as to be adjusted to the allowable input voltage range of the ADC circuit 24. The adjustment circuit 60 adjusts the output voltage range of the hall element 14a by adjusting a bias current delivered to the hall element 14a. More specifically, increasing the bias current enables the output voltage range thereof to be broaden, whereas decreasing the bias current enables the output voltage range thereof to be narrowed.

Also, the adjustment circuit 60 adjusts the offset of the hall element 14a by adjusting the value of voltage inputted to one of input terminals of the differential amplifier circuit 20. More specifically, increasing the current flowing through the fourth resistor R4 enables the output voltage range of the hall element 14a to be shifted to a high potential side, whereas decreasing the current flowing therethrough enables the output voltage range thereof to be shifted to a low potential side.

The above-described gain adjustment value and offset value can be calculated when an image pickup apparatus 500 or a focus control circuit 100 is shipped out of a manufacturing site. More specifically, when it is shipped from a factory as a finished product, the output voltage range of the hall element 14a is inspected based on an output value of the hall element 14a when the lens 10 is closest to the image pickup devices 16 and an output value thereof when the lens 10 is farthest from the image pickup devices 16.

After this inspection, calculated is a gain adjustment value with which to adjust the width of the output voltage range of the hall element 14a to the width of the allowable input voltage range of the ADC circuit 24. The possibility of malfunction is small as long as the width of the output voltage range of the hall element 14a is contained within the width of the allowable input voltage range of the ADC circuit 24. On the other hand, it is preferable, from the viewpoint of effective utilization of the ADC circuit 24, that the width of the output voltage range of the hall element 14a and the width of the allowable input voltage range of the ADC circuit 24 be practically identical to each other. Also calculated is an offset adjustment value with which to match the offset position of the inspected hall element 14a with the offset position of the ADC circuit 24.

The gain adjustment value and offset adjustment value calculated as above are stored in the image signal processor 50, and are set to the adjustment circuit 60 from the image signal processor 50 whenever the focus control circuit 100 is started up. If nonvolatile memory is incorporated in the focus control circuit 100, the gain adjustment value and the offset adjustment value may be stored in this nonvolatile memory. Also, whenever the focus control circuit 100 is started up, the gain adjustment value and the offset adjustment value may be calculated using the above-described method so as to set the adjustment circuit 60.

By employing the second embodiment as described above, at least one of the gain and the offset of the position detecting element 14 is adjusted, so that the accuracy of the output signal of the position detecting element 14 can be improved and therefore the accuracy of the above-described feedback control can be improved. Hence, the focusing accuracy in the above-described auto-focus control can be improved.

Also, implementing the regulator circuit 60 in hardware allows the high-speed calibration of the position detecting element 14. Also, where the gain adjustment value and the offset adjustment value are calculated every time the focus control circuit 100 is started up, environmental characteristics, such as temperature and humidity, in addition to the variations in the sensitivity can be calibrated.

The present invention has been described based upon illustrative embodiments. These embodiments are intended to be illustrative only and it will be obvious to those skilled in the art that various modifications to the combination of constituting elements and processes could be developed and that such modifications are also within the scope of the present invention.

In the above-described embodiments, a voice coil motor is used for the driver element 12. However, this should not be considered as limiting and, for example, a piezo element, a stepping motor or the like may be used for the driver element 12. A hall element is used as the position detecting element 14 but an MR element, a photo screen diode or the like may be used for the position detecting element 14. The PWM modulation circuit 40 and the H-bridge driver 42 are used as a driver circuit for driving the driver element 12. If, however, a driver element driven by analog signals instead of pulse signals is to be used, a digital-to-analog converter circuit and an amplifier circuit will be used as the driver circuit.

What is claimed is:

1. A focus control circuit installed in an image pickup apparatus including a lens; an image pickup device configured to convert light transmitted through the lens into an electric signal; a driver element for adjusting a position of the lens; and a position detecting element for detecting the position of the lens, the focus control circuit including:

an image signal processor configured to calculate a sharpness of an image signal picked up by the image pickup device in each of a plurality of positions of the lens and to determine a first target position from the plurality of positions for the lens where the sharpness is maximum;

a feedback equalizer configured to generate a first drive signal used to adjust the position of the lens identified by an output signal of the position detecting element to the first target position of the lens set by the image signal processor, based on a difference between the position of the lens identified by the output signal and the target position of the lens set by the image signal processor, and further configured to control the driver element so as to adjust the lens to the first target position based on the generated first drive signal; and a feedforward equalizer, including a high-pass filter having differential characteristics, configured to generate a second drive signal for moving the lens from the first target position to a second target position when the first target position of the lens as set by the image signal processor is changed, and further configured to control the driver element so as to move the lens to the second target position based on the generated second drive signal.

2. A focus control circuit according to claim 1, wherein the output signal of the position detecting element having passed through a low-pass filter is inputted to said feedback equalizer.

3. A focus control circuit installed in an image pickup apparatus including: a lens; a driver element for adjusting a position of the lens; and a Hall element for detecting the position of the lens, the focus control circuit including:

an equalizer configured to generate a drive signal used to adjust the position of the lens identified by an output signal of the Hall element to a target position of the lens set externally, based on a difference between the position of the lens identified by the output signal of the Hall element and the target position of the lens set externally, and further configured to output the drive signal to the driver element;

a differential amplifier circuit configured to amplify a potential difference between output terminals of the Hall element;

an analog-to-digital converter circuit configured to convert an output signal of the differential amplifier circuit from an analog value into a digital value, and to output the digital value to the equalizer; and an adjustment circuit configured to supply to the differential amplifier circuit an offset adjustment value for matching an offset position of the Hall element with an offset position of the analog-to-digital converter circuit, wherein the differential amplifier circuit adds the offset adjustment value to the output signal output to the analog-to-digital converter circuit.

4. A focus control circuit according to claim 3, wherein said adjustment circuit is configured to adjust an offset of the output signal of the Hall element by adjusting a voltage value inputted to an input terminal of said differential amplifier circuit.

5. An image pickup apparatus, comprising:

a lens;

an image pickup device configured to convert light transmitted through said lens into an electric signal;

a driver element configured to adjust the position of said lens;

a position detecting element configured to detect a position of said lens;

an image signal processor configured to calculate a sharpness of an image signal picked up by the image pickup device in each position of a plurality of positions of the lens and to determine a first target position from the plurality of positions for the lens where the sharpness is maximum;

a feedback equalizer configured to generate a first drive signal used to adjust the position of said lens identified by an output signal of said position detecting element to the first target position of said lens set by said image signal processor, based on a difference between the position of said lens identified by the output signal and the first target position of said lens, and further configured to control said driver element so as to adjust the lens to the first target position based on the first drive signal; and a feedforward equalizer, including a high-pass filter having differential characteristics, configured to generate a second drive signal for moving the lens from the first target position to a second target position when the first target position of the lens as set by the image signal processor is changed, and further configured to control the driver element so as to move the lens to the second target position based on the second drive signal.

* * * * *